Figure 1:
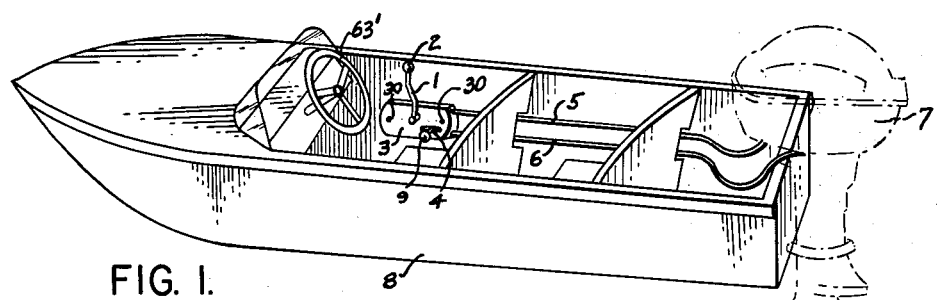

Jan. 14, 1964 H. EIERMANN 3,117,465
SINGLE LEVER ENGINE AND TRANSMISSION CONTROL
Filed Dec. 6, 1961 3 Sheets-Sheet 1

INVENTOR
HENRY EIERMANN
L. S. Saulsbury
ATTORNEY

Jan. 14, 1964   H. EIERMANN   3,117,465
SINGLE LEVER ENGINE AND TRANSMISSION CONTROL
Filed Dec. 6, 1961   3 Sheets-Sheet 2
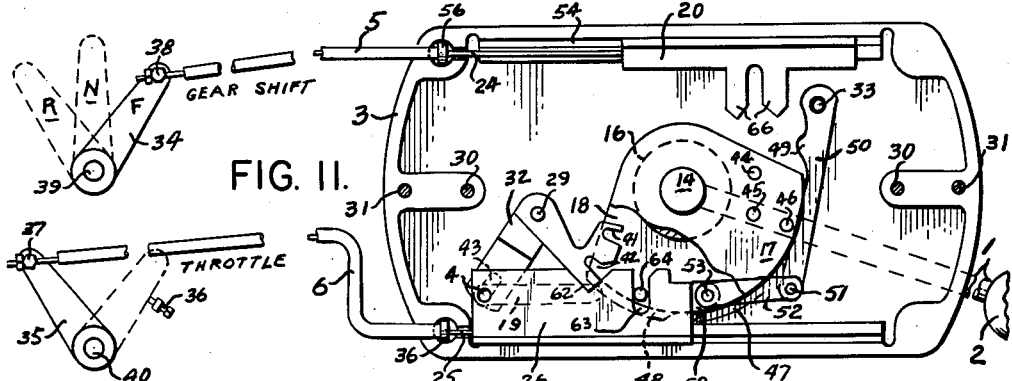
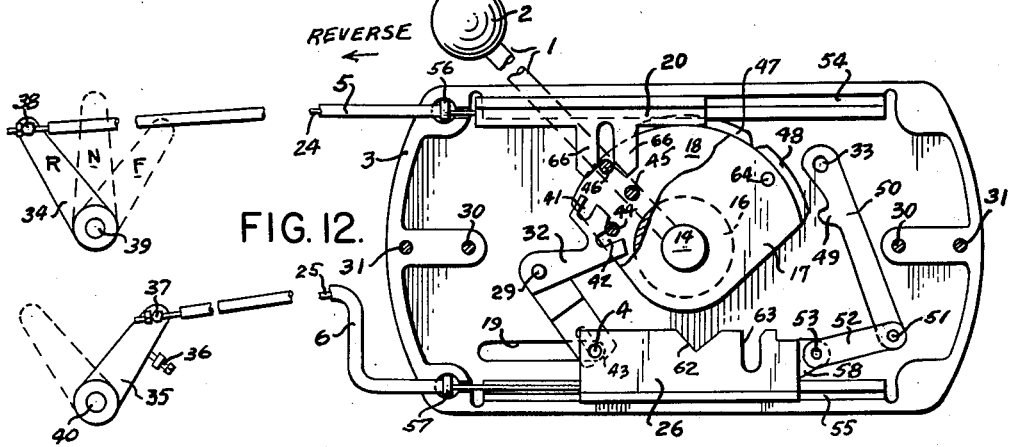
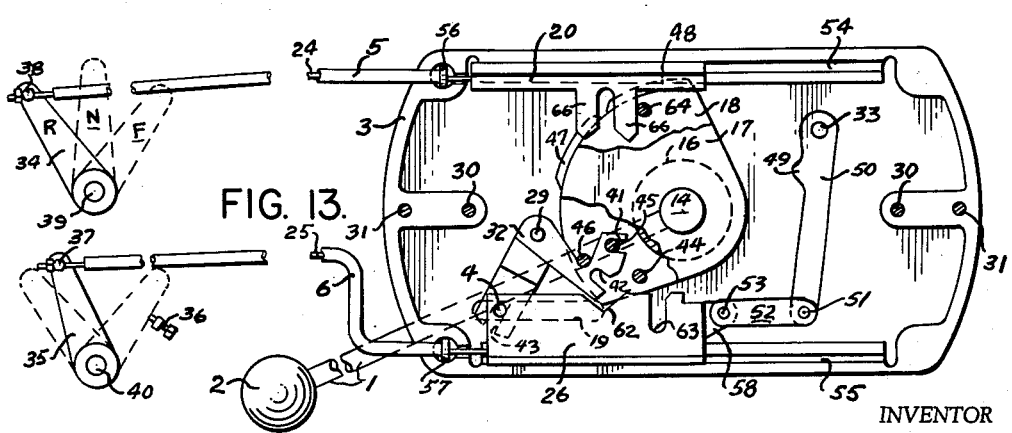
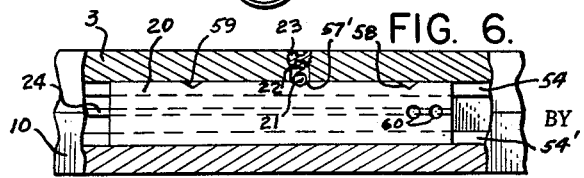
INVENTOR
HENRY EIERMANN
BY L. S. Saulsbury
ATTORNEY Jan. 14, 1964 H. EIERMANN 3,117,465
SINGLE LEVER ENGINE AND TRANSMISSION CONTROL
Filed Dec. 6, 1961 3 Sheets-Sheet 3
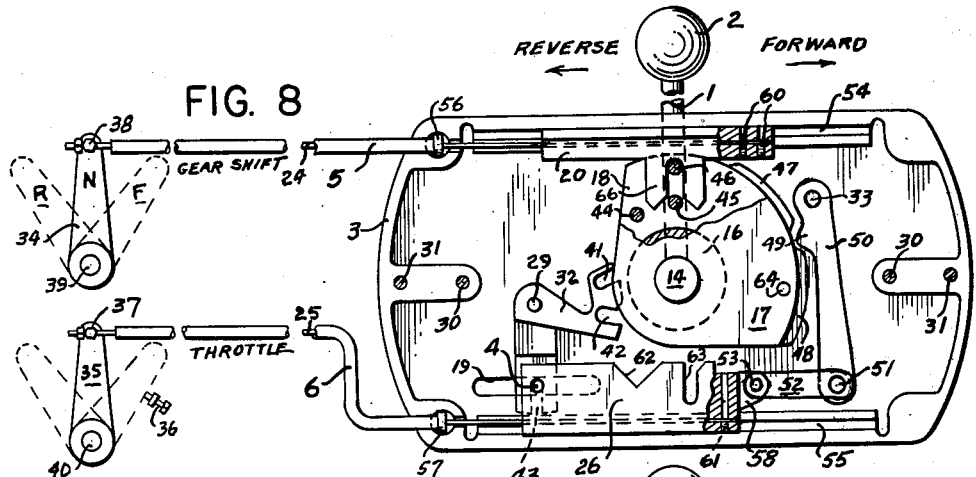
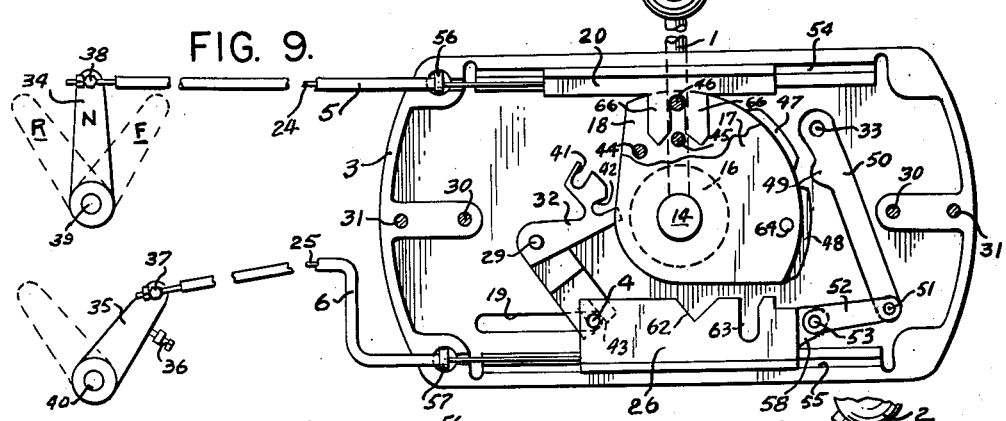
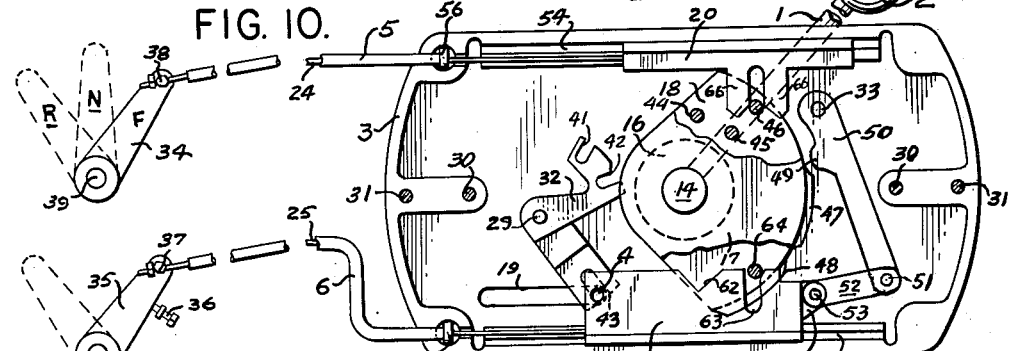
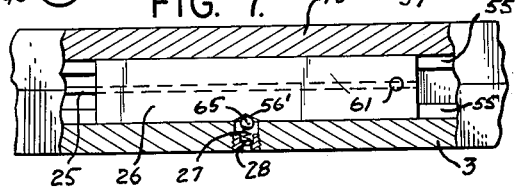
INVENTOR
HENRY EIERMANN
BY L. S. Saulsbury
ATTORNEY

United States Patent Office 3,117,465
Patented Jan. 14, 1964

3,117,465
SINGLE LEVER ENGINE AND TRANSMISSION CONTROL
Henry Eiermann, % Monarch Engineering & Mfg. Co., Inc., 2728 N. Adams St., Box 416, Peoria, Ill.
Filed Dec. 6, 1961, Ser. No. 157,466
3 Claims. (Cl. 74—472)

This invention relates to a novel single lever remote operating control for throttle and transmission synchronization particularly adapted to, but not restricted to, use on outboard marine craft.

In the art of marine motor control it is well known to provide a mechanism having a unitary control member which will in sequence first engage the selected direction of transmission drive, and subsequently progressively open the engine throttle in response to further displacement of this unitary control member in either of its selected directions away from a neutral position.

One of the objectives in such devices is to devise a structure for achieving such a synchronized dual control function so that it can be manufactured with a minimum of parts and labor, while at the same time providing a rugged, seaworthy product easy to install and fool proof under all operating conditions.

Another object is to allow free manual control of the throttle for starting and warm up sequences while the transmission is in its neutral state, while providing the capability of positively yielding the throttle control to the unitary control lever when it is moved away from neutral.

Such a control system should also assure that the engine is in an idling throttle state at any time that the transition between neutral and either the forward or reverse states of the transmission is taking place, so that the gearing will not be damaged, or the boat rendered out of control by gear engagement at high engine speeds.

The present invention achieves these objectives by a unique combination of elements in which the interaction of arcuately and linearly constrained members substantially simplifies the device as hereinafter detailed.

It is the principal object of the invention to provide a simple and reliable unitary engine control which will couple the transmission shift and throttle in the proper sequence and amplitude while permitting free throttle manipulation when the unitary control is in neutral.

It is another object of the invention to provide a rugged single lever engine control which has a minimum number of parts for ease of manufacture and maintenance.

It is still another object of the invention to provide a unitary engine control rotor which has coded into its contour the sequential information necessary to coordinate the operation of the transmission, the engine throttle, and the disablement of the auxiliary manual throttle control junction.

Figure 2:
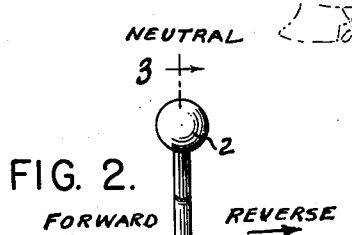
Figure 3:
Figures 4, 5:
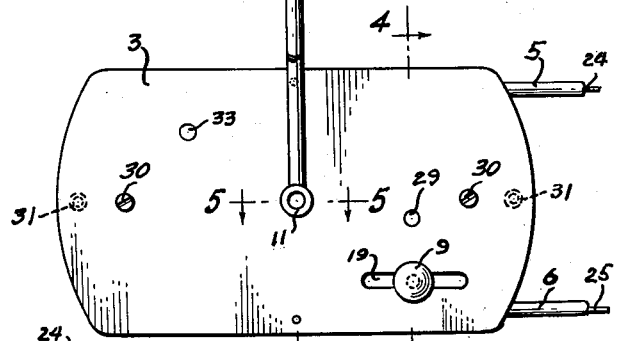

For other objects, and for a better understanding of the invention, reference may be had to the following detailed description taken in connection with the accompanying drawing, in which:

FIGURE 1 is a perspective view of a typical installation of the control device in an outboard motorboat showing the flexible Bowden wire linkage connecting the control unit with the throttle and gear shift controls on the outboard engine, FIG. 2 is an exterior view of the control unit showing the unitary control handle in the neutral position and the auxiliary throttle control handle in its mid-position, FIG. 3 is a vertical transverse sectional view of the control unit taken on line 3—3 of FIG. 2, FIG. 4 is a vertical transverse sectional view of the control unit taken on line 4—4 of FIG. 2, FIG. 5 is a fragmentary sectional view of the control unit taken on line 5—5 of FIG. 2, at right angles to the section 3—3 to show the handle keyway, FIG. 6 is a horizontal fragmentary sectional view of the control unit taken on line 6—6 of FIG. 3 to show the gear shift detent mechanism, FIG. 7 is a horizontal fragmentary sectional view of the control unit taken on line 7—7 of FIG. 3 to show the throttle detenting mechanism, FIG. 8 is a view taken on plane 8—8 of FIG. 3 with the cover shell 10 removed, unitary control lever 1 being in the neutral position and auxiliary manual throttle stud 4 being in its mid-position as in a starting operation, FIG. 9 is a view similar to that of FIG. 8, but with lever 1 in neutral while throttle stud 4 is in the low throttle or idling position and still under manual control, FIG. 10 is a view similar to that of FIG. 8, but with lever 1 in an advanced position in which the transmission has completed its shift into the forward gearing state while throttle slide 26 is still in its idling position and under control of lever 1, FIG. 11 is a view similar to that of FIG. 8, but with lever 1 in the full speed forward position in which throttle slide 26 is in its full open throttle position, FIG. 12 is a view similar to that of FIG. 8, but with lever 1 in a retarded position corresponding to the reverse gearing state in which throttle slide 26 is under control of lever 1 and is in the idling position, and FIG. 13 is a view similar to that of FIG. 8 but with lever 1 and slide 26 in the positions corresponding to full speed reverse.

Referring now to FIGS. 3 and 8 of the drawings, it may be seen that the preferred form of the invention is constructed within a split casing, preferably of die cast aluminum, consisting of front casing 3 and rear casing 10, between which the major components of the mechanism are either journalled or slidably guided. Casings 3 and 10 are secured together by the machine screws 31, which pass through casing 10 and are tapped into casing 3.

In FIG. 1, the main unitary control lever 1 and its handle 2 secured thereto may be seen protruding from the casing 3 which is secured to a side of boat 8 by screws 30 at a location convenient to the steering gear 63. The coordinated control actions imposed by lever 1 or by the slidable auxiliary manual throttle stud or lever 4 with its handle 9, are transmitted to the remote outboard motor 7 by the flexible Bowden push-pull wire guide sheaths 5 and 6 for controlling the gear shift and throttle, respectively.

Returning to FIGS. 3, 5 and 8, it may be seen that the unitary control lever 1 with its integral hub 11 is separably secured to the central control rotor shaft 14 by means of axial screw 12 and the keyway 13. Shaft 14 is journalled between casings 3 and 10 and is secured to the control rotor 16 by means of pin 15. Rotor 16 is provided with an integral front rotor flange 18, and an integral rear rotor flange 17.

The actuating pins 44, 45, 46 and 64 are secured between rotor flanges 17 and 18 to cooperate with movable members 20, 26, and 32 as described below.

The gear shift actuating slide 20 is provided with integral flanges which slidably engage groove 54 in casing 3 on one side and groove 54' in casing 10 on the opposite side. The push-pull gear shift control wire 24 is secured to slide 20 by set screws 60, whence it passes through flexible sheath 5 to the engine's gear shift lever 34, to which it is pivotally secured by the stud 38, so that the linear displacement of slide 20 results in the angular positioning of gear shift transmission shaft 39. Sheath 5 is secured to casings 3 and 10 by collar 56.

Similarly, the throttle actuating slide 26 is provided with integral flanges which slidably engage groove 55 in casing 3 on one side, and groove 55' in casing 10 on the opposite side. The push-pull throttle control wire 25 is secured to slide 26 by set screw 61, whence it passes through flexible guide sheath 6 to the engine's throttle lever 35, to which it is pivotally secured by the stud 37, so that linear displacement of slide 26 results in the angular positioning of throttle shaft 40. The engine throttle lever 35 is provided with an idling adjustment stop screw 36. Sheath 6 is secured to casing 3 and 10 by collar 57.

Gear slide 20 is provided with a detent system shown in FIGS. 3 and 6. Ball 21 urged by spring 22 and retained by screw 23 detents into conical cavity 57' in the neutral position shown. When slide 20 is in its forward gear engaging positions, ball 21 detents into cavity 59 in slide 20. Conversely, when slide 20 is in its reverse gear-engaging position, ball 21 detents into cavity 58 in slide 20.

Similarly, throttle slide 26 is provided with a single idling position detent as shown in FIGS. 3 and 7. The elements of this detent are the ball 65, spring 27, retaining screw 28, and detent cavity 56' in slide 26.

The positioning of gear shift slide 20 is accomplished by pin 46 on unitary control rotor 16 as it engages the slot formed by parallel fork teeth 66 integral with slide 20.

In the neutral position as shown in FIG. 8, pin 46 fully engages fork 66. As lever 1 is moved forwardly to the position shown in FIG. 10, slide 20 moves forwardly under the positive engagement between pin 46 and fork 66 until the detent ball 21 drops into cavity 59 and resiliently locks slide 20 into the forward position. Further forward motion of lever 1 into the position of FIG. 11, causes pin 46 to disengage fork 66 thus producing a detented lost motion condition in slide 20.

The converse sequence of engagement, detenting, and lost motion disengagement takes place between pin 46 and fork 66 as the lever 1 is moved in the reverse direction from the neutral position of FIG. 8 through that of FIG. 12 to the full speed reverse positioning shown in FIG. 13. In this case, detent ball 21 uses cavity 58 to lock slide 20 during the transition between the positions of FIGS. 12 and 13.

The throttle slide 26 is free for manual positioning by handle 9 and stud 4, only when unitary control lever 1 is in the neutral position. At all other times throttle slide 26 is under positive control of the rotor 16 thereby effectively disabling manual throttle handle 9 when lever 1 is out of neutral.

This overriding control of slide 26 by rotor 16 is accomplished by two independent mechanisms. The first is a cam and linkage mechanism which acts positively to restore slide 26 to its idle throttle position regardless of any previous manaually set positions during the transition of lever 1 from neutral to the position at which meshing of the transmission gears has just fully been accomplished for either forward or reverse motion of lever 1.

The second automatic control system over throttle slide 26 by rotor 16 is accomplished in the forward direction of lever 1 by a direct engagement between a pin 64 on the rotor and a fork slot 63 on the slide; whereas in the reverse direction of lever 1 the control of slide 26 by rotor 16 is accomplished by the action of rotor pins 44, 45, and 46 on an intermediate reverse action bell crank lever 32 which is coupled to slide 26 by a pin and slot connection.

The foregoing second control system takes over from the first cam and link system during the lost motion phases of the gear shift slide 20, so that approximately the last half of either direction of rotation of lever 1 away from neutral will be accompanied by a progressive opening of the engine's throttle under positive control by lever 1.

The foregoing cam and link mechanism includes cam lobes 47 and 48 integral with the outer periphery of rotor flange 18, cooperating with the cam following lobe 49 of cam follower lever 50. Lever 50 is journalled at the top on pin 33 which is secured to the casings 3 and 10. At the bottom, lever 50 is linked to an ear 58 of slide 26 by means of link 52 and link pins 51 and 53.

In this manner it may be seen that in the neutral position of FIGS. 8 and 9, the manual auxiliary throttle stud 4 may freely move slide 26 because the cam following lobe 49 may enter the cam depression formed between the cam lobes 47 and 48 as link 52 angulates lever 50 about axis 33 during the manual exercise of slide 26.

However, when unitary control lever 1 is moved clockwise away from the neutral position of FIG. 8 or 9 towards the forward gear engaged position of FIG. 10, the cam lobe 47 on rotor 16 will force cam follower lobe 49 to rotate lever 50 counterclockwise about pin 33, thereby drawing slide 26 by link 52 and ear 58 to the right into the low throttle idling position, regardless of where it had been manually left.

In FIG. 10, it may be seen that with further clockwise rotation of lever 1 as pin 64 begins to enter slot 63 of slide 26, thereby giving control of slide 26 to the rotor 16, the cam lobe 47 breaks away from contact with cam follower lobe 49 so as to again free slide 26 for motion, under the positive control of pin 64.

Conversely, when lever 1 is moved counterclockwise away from the neutral position of FIG. 8 or 9 towards the reverse gear engaged position of FIG. 12, the cam lobe 48 on rotor 16 will force cam follower lobe 49 to rotate lever 50 counterclockwise about pin 33, thereby drawing slide 26 by link 52 and ear 58 to the right into the low throttle idling position, regardless of where it had been left manually.

FIG. 12 shows that further counterclockwise rotation of lever 1 will engage pin 44 with crank 32 thereby giving control of slide 26 over to rotor 16. At this point it may also be seen that the contour of cam lobe 48 is just breaking away from contact with cam follower lobe 49 thereby freeing slide 26 from its locked idle throttle constraint for positive control by lever 1. As before noted, the forward throttle opening by lever 1 takes place by the engagement by pin 64 of rotor 16 with the fork 63 in slide 26 as shown in FIG. 10. Further clockwise rotation of lever 1 toward the position of FIG. 11 will positively force throttle slide 26 to the left thereby rotating the throttle shaft 40 counterclockwise into the open position.

The reverse engagement of rotor 16 with slide 26 may be seen in the progressive action shown in FIGS. 12 and 13. During this transition, pin 44 first enters the fork 42 of bellcrank lever 32 which is journalled in casings 3 and 10 by the pivot pin 29. Fork 43 in lever 32 embraces the shank of stud 4 which is threaded into throttle slides 26 at one end and, emerging through slot 19 in casing 3, is secured at its other end to the auxiliary manual throttle control knob 9.

Consequently, the linear displacement of slide 26 is positively coupled to the angular displacement of crank lever 32.

Counterclockwise rotation of lever 1 from the position of FIG. 12 to that of FIG. 13 thus rotates lever 32 clockwise, first by the action of pin 44 in fork 42, and subsequently, by the action of pin 45 entering fork 41 of crane 32. The consequent clockwise drive of lever 32 results in a progressive throttle opening by the leftward displacement of slides 26 under the force between stud 4 and slot 43, as required.

It will therefore be seen that with the unitary control knob 2 in the neutral position, the engine throttle may be opened by the manual positioning of knob 9 so that the engine may be started and warmed up.

Thereafter, full forward and reverse automatic control of the gear shifting and throttle modulation may be had by the respective advancing and retracting of lever 1 by knob 2 relative to its neutral position, with assurance that the throttle will automatically be forced to an idling state by lever 50 during the gear shifting action in either direction.

While various changes may be made in the detailed construction, it shall be understood that such changes shall be within the spirit and scope of the present invention as defined by the appended claims.

What is claimed is:

1. Remote control mechanism for the motor of an outboard marine craft with the motor provided with a gear shift and a throttle for controlling the fuel supply to the motor and speed of the boat, comprising a casing, a rotor in said casing, a main control lever rotatably mounted on the casing and operatively connected to said rotor, a three-position gear shifting control member, means of connection between said rotor and said control member, said means including a pin carried by said rotor, a fork member carried by said control member adapted to coact with said pin, said control member having three positions of adjustment, a throttle control member, an auxiliary control lever slidably mounted in the casing and operatively connected to said throttle control member for operating the same, means of connection between said rotor and said throttle control member, said means including another pin radiating from the rotor, a fork member carried by said throttle control member adapted to coact with said other pin for transmitting motion to said throttle control member, a bell crank lever pivotally mounted in the casing, a fork carried on the end of one of the arms of said bell crank lever, other spaced pins on said rotor adapted to coact with the fork on the bell crank lever, and a pin and slot connection between the other arm of the bell crank lever and the throttle control member.

2. A remote control mechanism for the motor of an outboard marine craft as described in claim 1, and spaced cam lobes carried by the rotor, a pivoted lever pivotally positioned in the casing in the path of movement of the cam lobes, and a pivoted link between the throttle control member and the pivoted lever, said pivoted lever having a follower lobe on one edge thereof in the path of movement of said first-named cam lobes for moving the throttle control member into low idling position by movement of the control lever in either a clockwise direction or a counterclockwise direction from neutral to either forward or reverse.

3. Remote control mechanism for the motor of an outboard marine craft with the motor provided with a throttle, a casing, a rotor in said casing, a control lever rotatably mounted in the casing and operatively connected to said rotor for turning the same, a throttle control member, means of connection between said rotor and said throttle control member, said means including a pin radiating from the rotor, a fork member carried by said throttle control member adapted to coact with said pin for transmitting motion to said throttle control member, a bell crank lever pivotally mounted in the casing, a fork carried on the end of one of the arms of the bell crank lever, other spaced pins on said rotor adapted to coact with the fork on the bell crank lever, and a pin and slot connection between the other arm of the bell crank lever and the throttle control member, spaced cam lobes carried by the rotor, a pivoted lever pivotally positioned in the casing in the path of movement of the cam lobes, and a pivoted link between the throttle control member and the pivoted lever, said pivoted lever having a follower lobe on one edge thereof in the path of movement of said first-named cam lobes for moving the throttle control member into low idling position by movement of the control lever in either a clockwise direction or a counterclockwise direction from neutral to either forward or reverse.

References Cited in the file of this patent

UNITED STATES PATENTS

| | | |
|---|---|---|
| 2,588,649 | Morse | Mar. 11, 1952 |
| 2,867,132 | Schroeder | Jan. 6, 1959 |